(12) United States Patent
Tsai et al.

(10) Patent No.: US 11,716,021 B1
(45) Date of Patent: Aug. 1, 2023

(54) POWER CONVERTER FOR PROVIDING NEGATIVE VOLTAGE

(71) Applicant: ANPEC ELECTRONICS CORPORATION, Hsinchu (TW)

(72) Inventors: Ping-Yu Tsai, Hsinchu (TW); Fu-Chuan Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/738,070

(22) Filed: May 6, 2022

(30) Foreign Application Priority Data

Mar. 1, 2022 (TW) .................................. 111107238

(51) Int. Cl.
*H02M 3/158* (2006.01)
*H02M 3/157* (2006.01)
*H02M 1/00* (2006.01)

(52) U.S. Cl.
CPC .......... *H02M 3/157* (2013.01); *H02M 1/0083* (2021.05); *H02M 3/1582* (2013.01)

(58) Field of Classification Search
CPC ...... H02M 3/156; H02M 3/157; H02M 3/158; H02M 3/1582; H02M 3/1584; H02M 1/0003; H02M 1/0032; H02M 1/0083
See application file for complete search history.

(56) References Cited

U.S. PATENT DOCUMENTS

| 6,546,048 | B1 * | 4/2003 | Ichiba | H03K 5/133 |
| | | | | 375/238 |
| 8,279,644 | B2 * | 10/2012 | Zhang | G05F 1/67 |
| | | | | 363/55 |
| 9,680,377 | B2 * | 6/2017 | Zhang | H02M 3/158 |
| 2009/0086511 | A1 * | 4/2009 | Lin | H02M 3/07 |
| | | | | 363/21.01 |
| 2019/0356215 | A1 * | 11/2019 | Lin | G05F 1/468 |
| 2022/0115953 | A1 * | 4/2022 | Rainer | H02M 3/1584 |
| 2023/0058431 | A1 * | 2/2023 | Yun | H02M 3/158 |

* cited by examiner

*Primary Examiner* — Thienvu V Tran
*Assistant Examiner* — Shahzeb K Ahmad
(74) *Attorney, Agent, or Firm* — Li & Cai Intellectual Property (USA) Office (57) ABSTRACT

A power converter for providing a negative voltage is provided. A coupling controller circuit receives a digital control signal and provides a control signal. A reverse voltage converter circuit receives the control signal and provides a reverse voltage. The reverse voltage converter circuit includes a first switch, a second switch, a third switch, a fourth switch, a fifth switch, a seventh switch, an eighth switch, a coupling control signal triggering circuit and a pulse width modulation circuit. A first reverse logic circuit is connected to a second reverse logic circuit. The second reverse logic circuit is connected to the pulse width modulation circuit and is configured to provide a trigger signal to the pulse width modulation circuit. The pulse width modulation circuit turns on or off the reverse voltage converter circuit according to the trigger signal.

10 Claims, 5 Drawing Sheets

FIG. 5

POWER CONVERTER FOR PROVIDING NEGATIVE VOLTAGE

CROSS-REFERENCE TO RELATED PATENT APPLICATION

This application claims the benefit of priority to Taiwan Patent Application No. 111107238, filed on Mar. 1, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter for providing a negative voltage, and more particularly to a power converter having a low-cost simple circuit structure for providing a negative voltage.

BACKGROUND OF THE DISCLOSURE

A ground terminal of a conventional power converter is often connected to a negative output voltage. Under this condition, the conventional power converter cannot be turned off by an enable signal inputted to an enable terminal of the conventional power converter. Therefore, an inverting buck boost circuit must be connected to a level shifting circuit such that the ground terminal of the conventional power converter is connected to a ground voltage level in a chip of the conventional power converter through of the level shifting circuit. However, a relatively complex circuit needs to be additionally arranged outside the conventional power converter. If the level shifting circuit is disposed inside the chip, a quantity of pins on the chip must be increased. As more pins are added, more area on the chip is occupied. Therefore, the size of the chip must be increased, which results in increased costs.

SUMMARY OF THE DISCLOSURE

In response to the above-referenced technical inadequacies, the present disclosure provides a power converter for providing a negative voltage. The power converter includes a coupling controller circuit and a reverse voltage converter circuit. The coupling controller circuit includes a first terminal, a second terminal, a first reverse logic circuit and a second reverse logic circuit. The first reverse logic circuit includes an input terminal and an output terminal. The second reverse logic circuit includes an input terminal and an output terminal. The first terminal of the coupling controller circuit receives a digital control signal. The second terminal of the coupling controller circuit provides a control signal. The reverse voltage converter circuit is configured to receive the control signal and provide a reverse voltage that is a negative voltage. The reverse voltage converter circuit includes a first switch, a second switch, a third switch, a fourth switch, a fifth switch, a sixth switch, a seventh switch, an eighth switch, a coupling control signal triggering circuit and a pulse width modulation circuit. The output terminal of the first reverse logic circuit is connected to the input terminal of the second reverse logic circuit. The output terminal of the second reverse logic circuit is connected to the pulse width modulation circuit and is configured to provide a trigger signal to the pulse width modulation circuit. The pulse width modulation circuit turns on or off the reverse voltage converter circuit according to the trigger signal.

In certain embodiments, the coupling controller circuit includes a coupling capacitor.

In certain embodiments, the digital control signal is a clock signal or a pulse width modulation signal. The control signal is a signal at a high voltage level or a low voltage level.

In certain embodiments, the coupling controller circuit includes a counter. The counter is configured to count the number of the digital control signal received by the first terminal of the coupling controller circuit. The counter is configured to trigger the second terminal of the coupling controller circuit to provide the control signal at the low voltage level, according to the number of the digital control signal. The second reverse logic circuit outputs the trigger signal to the pulse width modulation circuit such that the reverse voltage converter circuit is turned off, according to the control signal at the low voltage level.

In certain embodiments, the first switch includes a first terminal, a second terminal and a third terminal. The second switch includes a first terminal, a second terminal and a third terminal. The third switch includes a first terminal, a second terminal and a third terminal. The fourth switch includes a first terminal, a second terminal and a third terminal. The second terminal of the first switch is electrically connected to the second terminal of the second switch, the third terminal of the third switch, the second terminal of the fourth switch and the coupling controller circuit. The first terminal of the first switch is connected to a first voltage. The third terminal of the first switch is connected to the first terminal of the second switch. The third terminal of the second switch is connected to the first terminal of the third switch. The third terminal of the third switch is connected to the third terminal of the fourth switch. The third terminal of the fourth switch is connected to a second voltage. The fifth switch includes a first terminal, a second terminal and a third terminal. The sixth switch includes a first terminal, a second terminal and a third terminal. The seventh switch includes a first terminal, a second terminal and a third terminal. The eighth switch includes a first terminal, a second terminal and a third terminal. The first terminal of the fifth switch is connected to the third terminal of the first switch and the first terminal of the second switch. The second terminal of the fifth switch is connected to the second terminal of the seventh switch, the third terminal of the second switch and the first terminal of the third switch. The first terminal of the sixth switch is connected to the third terminal of the fifth switch. The second terminal of the fifth switch is connected to a third voltage. The first terminal of the seventh switch is connected to the third terminal of the eighth switch. The third terminal of the seventh switch is connected to the third terminal of the third switch and the first terminal of the fourth switch. The first terminal of the eighth switch is connected to the first voltage. The second terminal of the eighth switch is connected to the second voltage.

In certain embodiments, the input terminal of the first reverse logic circuit is connected to the second terminal of the fifth switch, the second terminal of the seventh switch, the third terminal of the second switch and the first terminal of the third switch.

In certain embodiments, the first switch includes a base terminal. The second switch includes a base terminal. The third switch includes a base terminal. The fourth switch includes a base terminal. The base terminal of the first switch, the base terminal of the second switch, the base terminal of the third switch and the base terminal of the fourth switch are connected to the third voltage.

In certain embodiments, the fifth switch includes a base terminal. The sixth switch includes a base terminal. The seventh switch includes a base terminal. The eighth switch includes a base terminal. The base terminal of the fifth switch is connected to the first voltage. The base terminal of the sixth switch is connected to the third voltage. The base terminal of the seventh switch is connected to the third voltage. The base terminal of the eighth switch is connected to the first voltage.

In certain embodiments, the first switch, the second switch, the fifth switch and the eighth switch are p-type metal-oxide-semiconductor (PMOS) transistors. The third switch, the fourth switch, the sixth switch and the seventh switch are n-type metal-oxide-semiconductor (NMOS) transistors.

In certain embodiments, the digital control signal is provided by a central processing unit (CPU), an application specific integrated circuit (ASIC), a graphics processing unit (GPU) or a microprocessor (MCU).

As described above, the present disclosure provides the power converter for providing the negative voltage. The power converter of the present disclosure has the reverse voltage converter circuit that can be effectively turned on or off according to the digital control signal, which allows for a simple circuit configuration and low energy consumption.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In the present disclosure, any one of circuit components having more than three pins shall have the pins represented by reference numbers that are marked near locations of the pins in the figures. If any one of circuit components has two pins, a left terminal or an upper terminal of the one of the circuit components is an input terminal or a first terminal, and a right terminal or a lower terminal of the one of the circuit components is an output terminal or a second terminal.

First Embodiment

Figure 1:
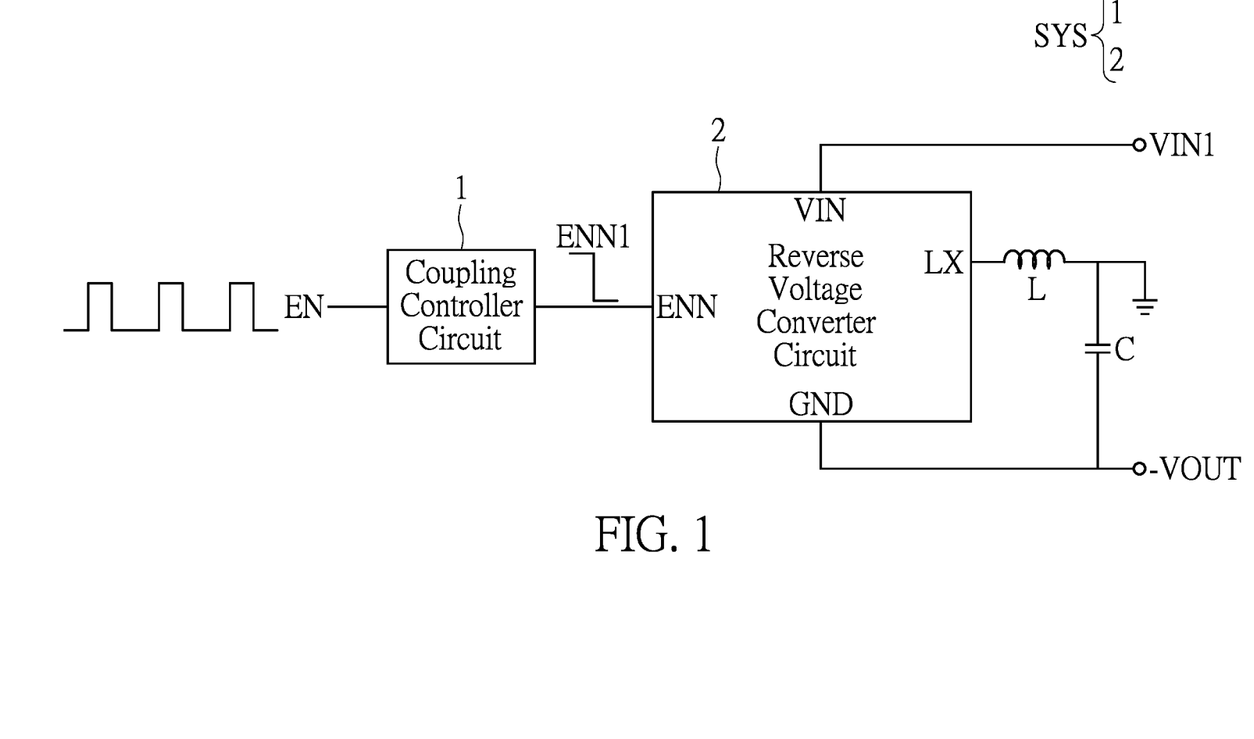
FIG. 1 is a first schematic diagram of a power converter according to an embodiment of the present disclosure.
Figure 2:
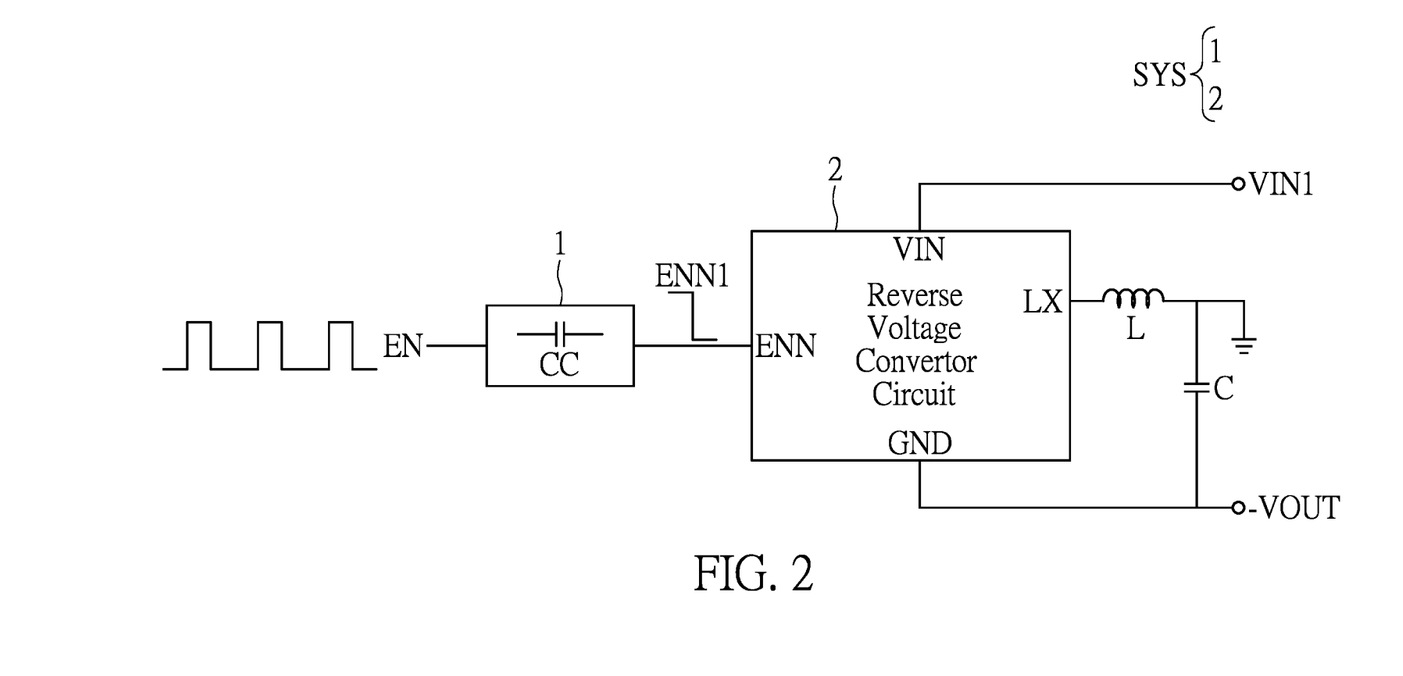
FIG. 2 is a second schematic diagram of the power converter according to the embodiment of the present disclosure.
Figure 3:
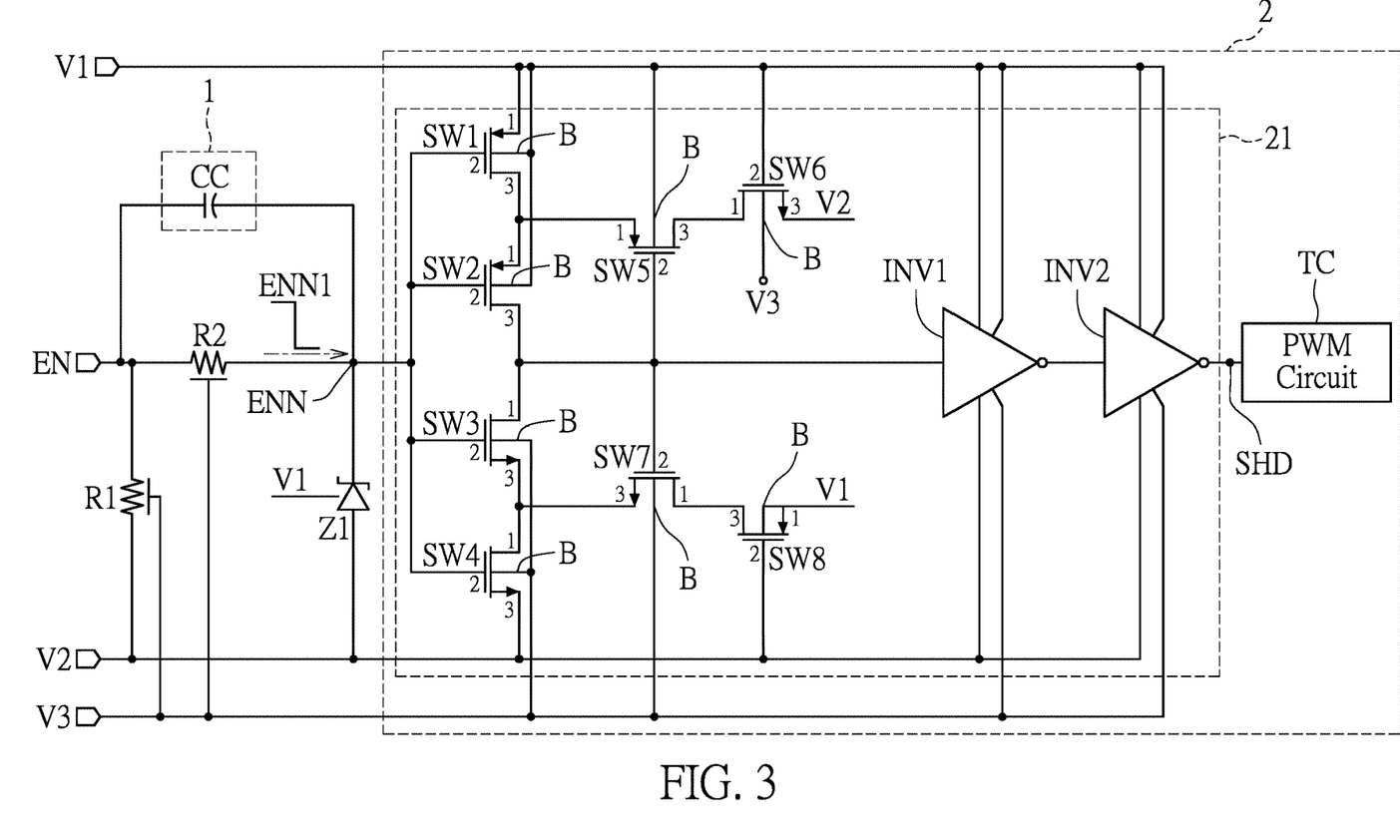
FIG. 3 is a circuit diagram of some of circuit components of the power converter according to the embodiment of the present disclosure.

Reference is made to FIGS. 1 to 3, in which FIG. 1 is a first schematic diagram of a power converter according to an embodiment of the present disclosure, FIG. 2 is a second schematic diagram of the power converter according to the embodiment of the present disclosure, and FIG. 3 is a circuit diagram of some of circuit components of the power converter according to the embodiment of the present disclosure.

A power converter SYS includes a coupling controller circuit 1 and a reverse voltage converter circuit 2. The coupling controller circuit 1 is connected to the reverse voltage converter circuit 2. The coupling controller circuit 1 includes a first terminal and a second terminal. The first terminal of the coupling controller circuit 1 receives a digital control signal EN. The second terminal of the coupling controller circuit 1 provides a control signal ENN1. An input voltage terminal VIN of the reverse voltage converter circuit 2 is connected to an input voltage VIN1. A ground terminal of the reverse voltage converter circuit 2 is connected to a reverse output voltage −VOUT that is lower than a zero voltage. The reverse output voltage −VOUT is an output voltage of the reverse voltage converter circuit 2. The reverse output voltage −VOUT is a negative voltage. The reverse voltage converter circuit 2 receives the control signal ENN1 from the coupling controller circuit 1 and is turned on or off according to the control signal ENN1. An inductor voltage terminal LX is connected to a first terminal of an inductor L. A second terminal of the inductor L is connected to the reverse output voltage −VOUT through an output capacitor C. In addition, the second terminal of the inductor L is connected to a ground level.

As shown in FIG. 2, the coupling controller circuit 1 may include a coupling capacitor CC. In the embodiment, the digital control signal EN may be a clock signal or a pulse width modulation signal. The control signal ENN1 is a signal at a high voltage level or a low voltage level.

After the coupling capacitor CC of the coupling controller circuit 1 receives the digital control signal EN that is an AC signal, the coupling capacitor CC filters out a direct current component of the digital control signal EN such that the digital control signal EN is converted into the control signal ENN1 at the high voltage level or the low voltage level. The coupling capacitor CC provides the control signal ENN1 to a control signal input terminal ENN of the reverse voltage converter circuit 2 to turn on or off the reverse voltage converter circuit 2. The coupling capacitor CC of the coupling controller circuit 1 is exemplified in the embodiment, but the present disclosure is not limited thereto. The coupling controller circuit 1 may be replaced with other coupling signal converter circuits.

As shown in FIG. 3, the reverse voltage converter circuit 2 may be directly controlled by the control signal ENN1. The reverse voltage converter circuit 2 may include a coupling control signal triggering circuit 21. The coupling control signal triggering circuit 21 more accurately identifies and uses the control signal ENN1.

The coupling control signal triggering circuit 21 includes a first switch SW1, a second switch SW2, a third switch SW3, a fourth switch SW4, a fifth switch SW5, a sixth switch SW6, a seventh switch SW7, an eighth switch SW8, a first reverse logic circuit INV1 and a second reverse logic circuit INV2.

The first switch SW1 includes a first terminal, a second terminal and a third terminal. The second switch SW2 includes a first terminal, a second terminal and a third terminal. The third switch SW3 includes a first terminal, a second terminal and a third terminal. The fourth switch SW4 includes a first terminal, a second terminal and a third terminal.

The second terminal of the first switch SW1 is electrically connected to the second terminal of the second switch SW2, the third terminal of the third switch SW3, the second terminal of the fourth switch SW4 and the coupling controller circuit 1.

The first terminal of the first switch SW1 is connected to a first voltage V1. The third terminal of the first switch SW1 is connected to the first terminal of the second switch SW2. The third terminal of the second switch SW2 is connected to the first terminal of the third switch SW3. The third terminal of the third switch SW3 is connected to the third terminal of the fourth switch SW4. The third terminal of the fourth switch SW4 is connected to a second voltage V2.

As shown in FIG. 3, the coupling controller circuit 1 includes the coupling capacitor CC. A first terminal of the coupling capacitor CC is connected to the digital control signal EN. A second terminal of the coupling capacitor CC is connected to the second terminal of the first switch SW1, the second terminal of the second switch SW2, the second terminal of the third switch SW3 and the second terminal of the fourth switch SW4.

A first resistor R1, a second resistor R2 and a diode Z1 are disposed corresponding to the coupling capacitor CC and provide the control signal ENN1 that is a stable signal to the reverse voltage converter circuit 2.

The fifth switch SW5 includes a first terminal, a second terminal and a third terminal. The sixth switch SW6 includes a first terminal, a second terminal and a third terminal. The seventh switch SW7 includes a first terminal, a second terminal and a third terminal. The eighth switch SW8 includes a first terminal, a second terminal and a third terminal. The first terminal of the fifth switch SW5 is connected to the third terminal of the first switch SW1 and the first terminal of the second switch SW2.

The second terminal of the fifth switch SW5 is connected to the second terminal of the seventh switch SW7, the third terminal of the second switch SW2 and the first terminal of the third switch SW3. The first terminal of the sixth switch SW6 is connected to the third terminal of the fifth switch SW5. The second terminal of the fifth switch SW5 is connected to a third voltage V3. The first terminal of the seventh switch SW7 is connected to the third terminal of the eighth switch SW8. The third terminal of the seventh switch SW7 is connected to the third terminal of the third switch SW3 and the first terminal of the fourth switch SW4. The first terminal of the eighth switch SW8 is connected to the first voltage V1. The second terminal of the eighth switch SW8 is connected to the second voltage V2. The first reverse logic circuit INV1 includes an input terminal and an output terminal. The second reverse logic circuit INV2 includes an input terminal and an output terminal.

The input terminal of the first reverse logic circuit INV1 is connected to the second terminal of the fifth switch SW5, the second terminal of the seventh switch SW7, the third terminal of the second switch SW2 and the first terminal of the third switch SW3.

The output terminal of the first reverse logic circuit INV1 is connected to the input terminal of the second reverse logic circuit INV2. The output terminal of the second reverse logic circuit INV2 is connected to a pulse width modulation (PWM) circuit TC and provides a trigger signal to the pulse width modulation circuit TC. The pulse width modulation circuit TC turns on or off the reverse voltage converter circuit 2 according to the trigger signal.

In the embodiment, the first switch SW1 further includes a base terminal B. The second switch SW2 further includes a base terminal B. The third switch SW3 further includes a base terminal B. The fourth switch SW4 further includes a base terminal B. The base terminal B of the first switch SW1, the base terminal B of the second switch SW2, the base terminal B of the third switch SW3 and the base terminal B of the fourth switch SW4 are connected to the third voltage V3.

Similarly, the fifth switch SW5 further includes a base terminal B. The sixth switch SW6 further includes a base terminal B. The seventh switch SW7 further includes a base terminal B. The eighth switch SW8 further includes a base terminal B.

The base terminal B of the sixth switch SW5 is connected to the first voltage V1. The base terminal B of the sixth switch SW6 is connected to the third voltage V3. The base terminal B of the seventh switch SW7 is connected to the third voltage V3. The base terminal B the eighth switch SW8 is connected to the first voltage V1. The first voltage V1, second voltage V2 and the third voltage V3 of the embodiment may be adjusted according to actual requirements, and the present disclosure is not limited thereto.

The digital control signal EN may be provided by a central processing unit (CPU), an application specific integrated circuit (ASIC), a graphics processing unit (GPU) or a microprocessor (MCU).

In the embodiment, the first switch SW1, the second switch SW2, the fifth switch SW5 and the eighth switch SW8 are p-type metal-oxide-semiconductor (PMOS) transistors. In the embodiment, the third switch SW3, the fourth switch SW4, the sixth switch SW6 and the seventh switch SW7 are n-type metal-oxide-semiconductor (NMOS) transistors.

The first reverse logic circuit INV1 and the second reverse logic circuit INV2 are inverters.

Figure 4:
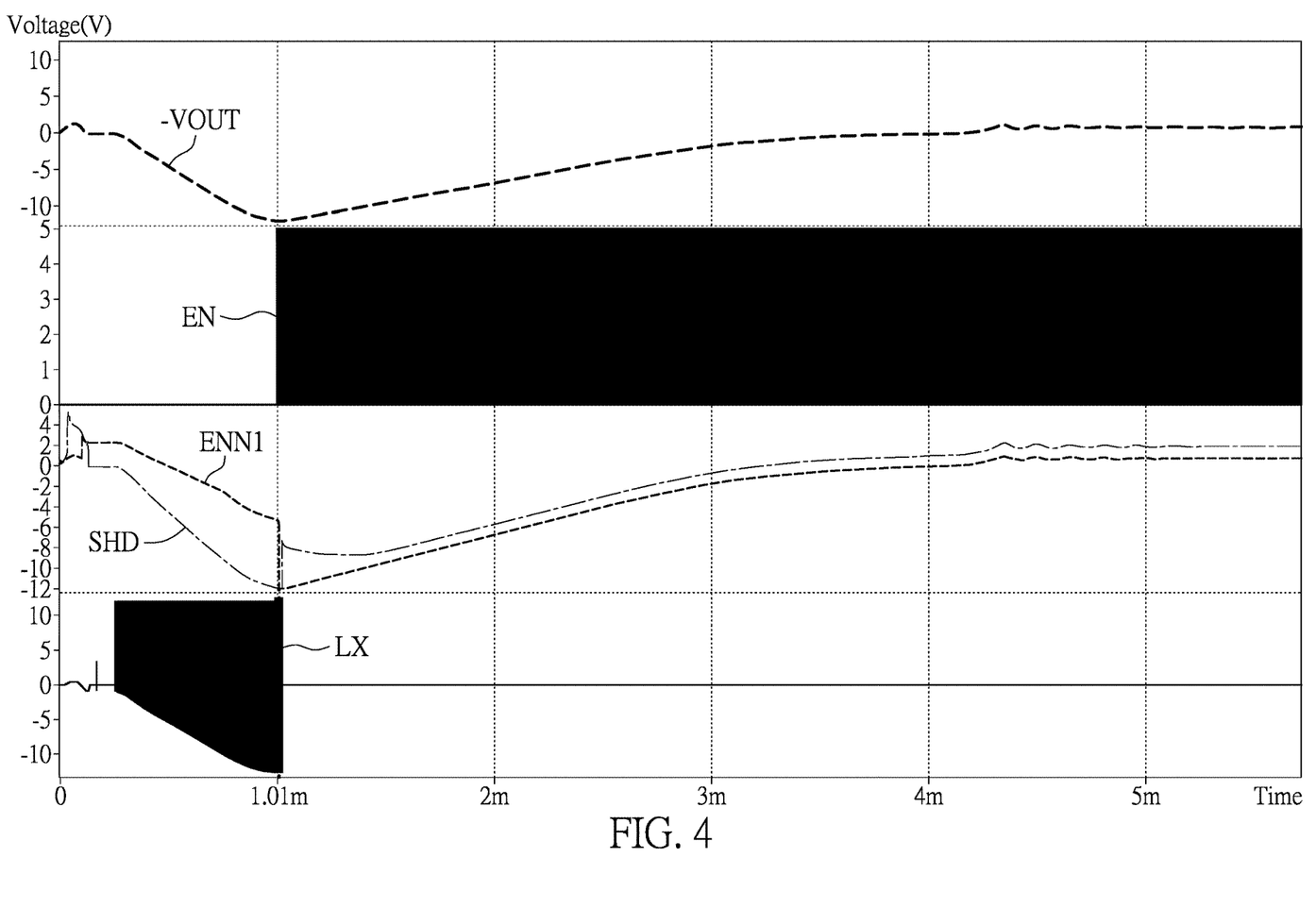
FIG. 4 is a first waveform diagram of voltage signals of the power converter according to the embodiment of the present disclosure.
Figure 5:
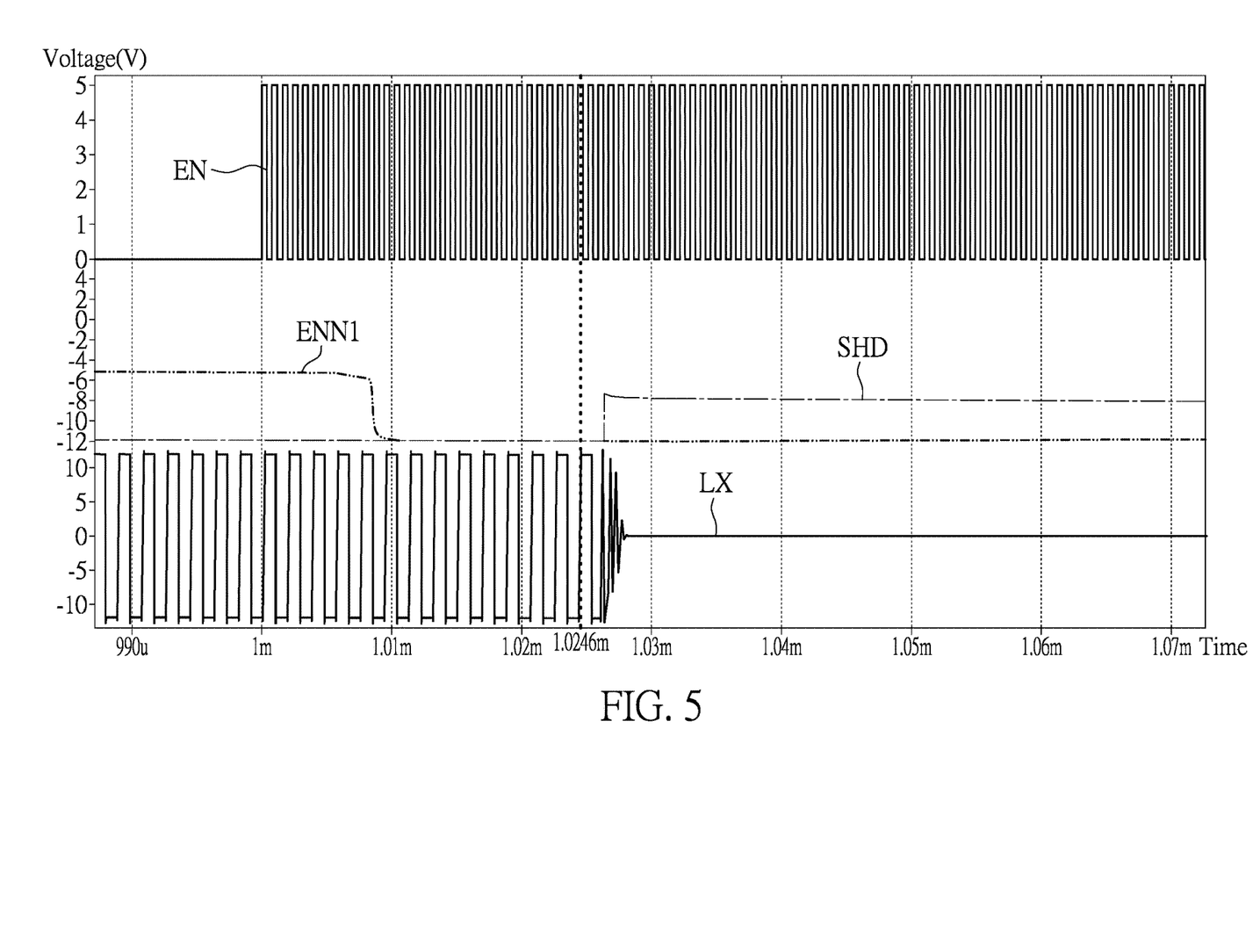
FIG. 5 is a second waveform diagram of the voltage signals of the power converter according to the embodiment of the present disclosure.

Reference is made to FIGS. 1 to 5, in which FIG. 4 is a first waveform diagram of voltage signals of the power converter device according to the embodiment of the present disclosure, and FIG. 5 is a second waveform diagram of the voltage signals of the power converter device according to the embodiment of the present disclosure.

As shown in FIG. 1 or FIG. 2, the coupling controller circuit 1 receives the digital control signal EN. A curve of the digital control signal EN is shown in FIGS. 4 and 5. As shown in FIG. 1 or FIG. 2, the coupling controller circuit 1 provides the control signal ENN1 to the reverse voltage converter circuit 2. A curve of the control signal ENN1 is shown in FIGS. 4 and 5. As shown in FIG. 3, the PWM circuit TC is turned off by a trigger signal SHD. A curve of the trigger signal SHD is shown in FIGS. 4 and 5. A curve of a voltage of the inductor voltage terminal LX of the reverse voltage converter circuit 2 is represented by LX in FIGS. 4 and 5. A curve of the reverse output voltage −VOUT of the reverse voltage converter circuit 2 in FIG. 1 or FIG. 2 is shown in FIG. 4.

As shown in FIG. 4, after the coupling controller circuit 1 is triggered by the digital control signal EN, the voltage of the inductor voltage terminal LX is dropped down, and the control signal ENN1 is dropped down for a period of time. In other embodiments, the digital control signal EN may be the clock signal or the pulse width modulation signal.

After the coupling controller circuit 1 is triggered by the digital control signal EN for a period of time, the control signal ENN1 transits from a high voltage level (such as −5V) to a low voltage level (−12V). At this time, the control signal ENN1 is maintained at the low voltage level (such as −12V) for a period of time. Then, the trigger signal SHD by which the PWM circuit TC is turned off increases from the low voltage level (such as −12V) to a high voltage level (such as −7V) such that the PWM circuit TC is turned off. As a result, the reverse voltage converter circuit 2 is turned off. When a voltage of the trigger signal SHD by which the PWM circuit TC is turned off is adjusted to the high voltage level (such as −7V), the inductor voltage terminal LX is not changed and the reverse output voltage −VOUT increases from a negative voltage level (such as −12V) to a zero voltage.

As is clearly depicted in FIG. 5, after the coupling controller circuit 1 is triggered by the digital control signal EN for period of times, the control signal ENN1 transits from the high voltage level (such as −5V) to the low voltage level (−12V). At this time, the control signal ENN1 is maintained at the low voltage level (such as −12V) for period of times. Then, the trigger signal SHD by which the PWM circuit TC is turned off increases from the low voltage level (such as −12V) to the high voltage level (such as −7V) such that the PWM circuit TC is turned off. As a result, the reverse voltage converter circuit 2 is turned off. When the voltage of the trigger signal SHD by which the PWM circuit TC is turned off is adjusted to the high voltage level (such as −7V), the inductor voltage terminal LX is not changed.

In the embodiment, the coupling controller circuit 1 may include a counter (not shown in figures). The counter may be configured to count the number of the received digital control signal EN and accordingly trigger the control signal ENN1 to be transited to the low voltage level (such as −12V). The second reverse logic circuit INV2, according to the control signal ENN1 at the low voltage level, provides the trigger signal SHD to the PWM circuit TC to turn off the PWM circuit TC. As a result, the reverse voltage converter circuit 2 is turned off. In other embodiments, the coupling controller circuit 1 may further include a determining circuit such as a working period comparing circuit. The working period comparing circuit is configured to determine a level of the control signal ENN1 according to a working period of the digital control signal EN.

Beneficial Effects of the Embodiments

In conclusion, the present disclosure provides the power converter for providing the negative voltage. The power converter of the present disclosure has a simple circuit configuration in which the reverse voltage converter circuit is effectively turned on or off according to the digital control signal, which only results in low energy consumption.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter for providing a negative voltage, comprising:
a coupling controller circuit including a first terminal, a second terminal, a first reverse logic circuit and a second reverse logic circuit, wherein the first reverse logic circuit includes an input terminal and an output terminal, the second reverse logic circuit includes an input terminal and an output terminal, the first terminal of the coupling controller circuit receives a digital control signal, and the second terminal of the coupling controller circuit provides a control signal; and
a reverse voltage converter circuit configured to receive the control signal and provide a reverse voltage that is a negative voltage, wherein the reverse voltage converter circuit includes a first switch, a second switch, a third switch, a fourth switch, a fifth switch, a sixth switch, a seventh switch, an eighth switch, a coupling control signal triggering circuit and a pulse width modulation circuit;
wherein the output terminal of the first reverse logic circuit is connected to the input terminal of the second reverse logic circuit, the output terminal of the second reverse logic circuit is connected to the pulse width modulation circuit and is configured to provide a trigger signal to the pulse width modulation circuit, and the pulse width modulation circuit turns on or off the reverse voltage converter circuit according to the trigger signal.

2. The power converter according to claim 1, wherein the coupling controller circuit includes a coupling capacitor.

3. The power converter according to claim 1, wherein the digital control signal is a clock signal or a pulse width modulation signal, and the control signal is a signal at a high voltage level or a low voltage level.

4. The power converter according to claim 3, wherein the coupling controller circuit includes a counter configured to count the number of the digital control signal received by the first terminal of the coupling controller circuit, the counter is configured to trigger the second terminal of the coupling controller circuit to provide the control signal at the low voltage level according to the number of the digital control signal, and the second reverse logic circuit outputs the trigger signal to the pulse width modulation circuit such that the reverse voltage converter circuit is turned off according to the control signal at the low voltage level.

5. The power converter according to claim 1, wherein the first switch includes a first terminal, a second terminal and a third terminal, the second switch includes a first terminal, a second terminal and a third terminal, the third switch includes a first terminal, a second terminal and a third terminal, and the fourth switch includes a first terminal, a second terminal and a third terminal;

wherein the second terminal of the first switch is electrically connected to the second terminal of the second switch, the third terminal of the third switch, the second terminal of the fourth switch and the coupling controller circuit, the first terminal of the first switch is connected to a first voltage, the third terminal of the first switch is connected to the first terminal of the second switch, the third terminal of the second switch is connected to the first terminal of the third switch, the third terminal of the third switch is connected to the third terminal of the fourth switch, and the third terminal of the fourth switch is connected to a second voltage;

wherein the fifth switch includes a first terminal, a second terminal and a third terminal, the sixth switch includes a first terminal, a second terminal and a third terminal, the seventh switch includes a first terminal, a second terminal and a third terminal, and the eighth switch includes a first terminal, a second terminal and a third terminal;

wherein the first terminal of the fifth switch is connected to the third terminal of the first switch and the first terminal of the second switch, the second terminal of the fifth switch is connected to the second terminal of the seventh switch, the third terminal of the second switch and the first terminal of the third switch, the first terminal of the sixth switch is connected to the third terminal of the fifth switch, the second terminal of the fifth switch is connected to a third voltage, the first terminal of the seventh switch is connected to the third terminal of the eighth switch, the third terminal of the seventh switch is connected to the third terminal of the third switch and the first terminal of the fourth switch, the first terminal of the eighth switch is connected to the first voltage, and the second terminal of the eighth switch is connected to the second voltage.

6. The power converter according to claim 5, wherein the input terminal of the first reverse logic circuit is connected to the second terminal of the fifth switch, the second terminal of the seventh switch, the third terminal of the second switch and the first terminal of the third switch.

7. The power converter according to claim 6, wherein the first switch includes a base terminal, the second switch includes a base terminal, the third switch includes a base terminal, the fourth switch includes a base terminal, and the base terminal of the first switch, the base terminal of the second switch, the base terminal of the third switch and the base terminal of the fourth switch are connected to the third voltage.

8. The power converter according to claim 7, wherein the fifth switch includes a base terminal, the sixth switch includes a base terminal, the seventh switch includes a base terminal, the eighth switch includes a base terminal, the base terminal of the fifth switch is connected to the first voltage, the base terminal of the sixth switch is connected to the third voltage, the base terminal of the seventh switch is connected to the third voltage, and the base terminal of the eighth switch is connected to the first voltage.

9. The power converter according to claim 8, wherein the first switch, the second switch, the fifth switch and the eighth switch are p-type metal-oxide-semiconductor (PMOS) transistors, and the third switch, the fourth switch, the sixth switch and the seventh switch are n-type metal-oxide-semiconductor (NMOS) transistors.

10. The power converter according to claim 1, wherein the digital control signal is provided by a central processing unit (CPU), an application specific integrated circuit (ASIC), a graphics processing unit (GPU) or a microprocessor (MCU).

* * * * *